United States Patent [19]
Fulton

[11] Patent Number: 5,661,750
[45] Date of Patent: Aug. 26, 1997

[54] DIRECT SEQUENCE SPREAD SPECTRUM SYSTEM

[75] Inventor: Forrest F. Fulton, Los Altos Hills, Calif.

[73] Assignee: CellNet Data Systems, Inc., San Carlos, Calif.

[21] Appl. No.: 473,011

[22] Filed: Jun. 6, 1995

[51] Int. Cl.[6] .................................................. H04K 1/00
[52] U.S. Cl. ........................ 375/208; 375/367; 375/206
[58] Field of Search .......................... 375/200, 354, 375/206, 208, 279, 295, 316, 329, 367; 364/717; 327/164; 370/105.1, 18

[56] References Cited

U.S. PATENT DOCUMENTS

| | | | |
|---|---|---|---|
| 4,112,368 | 9/1978 | Ewanus et al. | 375/200 |
| 4,297,700 | 10/1981 | Nard et al. | 342/125 |
| 4,665,404 | 5/1987 | Christy et al. | 342/463 |
| 4,930,139 | 5/1990 | Chandler et al. | 375/1 |
| 4,969,159 | 11/1990 | Belcher et al. | 375/1 |
| 5,309,474 | 5/1994 | Gilhousen et al. | 375/1 |
| 5,341,423 | 8/1994 | Nossen | 375/200 |
| 5,469,468 | 11/1995 | Schilling | 375/202 |

*Primary Examiner*—Tesfaldet Bocure
*Attorney, Agent, or Firm*—Fish & Richardson, P.C.

[57] ABSTRACT

A direct-sequence spread spectrum communication system using a high power transmitter and a short spreading sequence which still satisfies FCC Rule 15.247 regarding power density. In addition to the spreading sequence, the carrier signal is modulated with a phase reversal sequence. Typically, each period of the phase reversal sequence has a duration equal to the total duration of the spreading sequence. The phase reversal sequence reduces the maximum power density of the signal, but is transparent to a receiver.

37 Claims, 9 Drawing Sheets

DIRECT SEQUENCE SPREAD SPECTRUM SYSTEM

BACKGROUND OF THE INVENTION

The present invention relates to direct-sequence spread spectrum radio communications systems, and particularly to systems using a short spreading sequence while still achieving low power density.

In standard radio communications, information transmission is accomplished by modulating a carrier signal in response to data. In spread spectrum communications, the carrier signal is additionally modulated by a spreading function. The advantages of spread spectrum communications include security, reduced interference, and compliance with Federal Communications Commission (FCC) Rules. Spread spectrum communication systems which comply with FCC Rules may operate without a license. Spread spectrum communications may be used for alarm systems, smoke detectors, utility metering systems, personal and automobile locators, and other applications involving many transmitters but few receivers.

FCC Rule 15.247 imposes four requirements on the spread spectrum communication system. First, the transmitter power cannot exceed one watt. Second, the receiver processing gain must be at least +10 decibels (dB). Third, the spectrum must be spread across at least a 500 kilohertz (kHz) bandwidth. Fourth, and most importantly for the purposes of the present invention, there is a maximum power density restriction. No more than +8 decibels above one milliwatt (dBm) of power may be concentrated within any three kilohertz bandwidth.

A typical spreading function is a pseudo-random pattern composed of a repeating sequence. The repeating sequence has a set number of periods or "chips" each of the same duration. During each period a phase, amplitude, or frequency modulation is applied to the signal. A pseudo-random sequence is selected so that the pattern appears to be noise. As used herein, the "length" of a pseudo-random sequence refers to the number of chips in the sequence, whereas the "duration" of a pseudo-random sequence refers to the amount of time for the communication system to pass through the sequence.

A typical transmitter of a pseudo-random signal generates a carrier, applies the pseudo-random modulation to the carrier, and then applies data modulation to the pseudo-randomly modulated carrier. As is well known in the art, one effect of the application of a pseudo-random sequence to the carrier signal is to spread the spectrum power over a wide band. A transmitter to be certified under FCC Rule 15.247 must spread signal power over at least 500 kHz. This may be accomplished by using chips shorter than about two microseconds, for a biphase form of spreading modulation.

A typical receiver for a pseudo-random signal uses a local oscillator to heterodyne the received signal to an intermediate frequency. By modulating the local oscillator signal with the same pseudo-random sequence, the spectrum spreading is cancelled, and the received signal fits into a relatively narrow bandwidth intermediate frequency filter. Such a system can meet the processing gain required by FCC Rule 15.247 with a pseudo-random sequence shorter than 63 chips, and possibly as short as 15 chips.

In order for the spectrum spreading to cancel and produce intelligible data, the pseudo-random sequence generated in the receiver must be time-synchronized with the sequence of the received signal. A typical procedure for acquiring synchronization is to step the starting point of the locally generated sequence through the range of the sequence while monitoring the amount of signal power coming through the narrow intermediate frequency filter. When the locally generated sequence is not synchronized, the spectrum remains spread, and only a small amount of the received signal power passes through the intermediate frequency filter. However, when the locally generated sequence is nearly synchronized to the correct timing, the spreading is cancelled, most of the received signal power fits into the narrow band of the intermediate frequency filter, and the monitored signal power increases by the processing gain of the system. After achieving a rough synchronization, the system stops stepping through the pseudo-random sequence, and makes smaller shifts to refine the accuracy of the synchronization.

If a spread spectrum communication system has many transmitters sending to one receiver, the signals from the various remote transmitters will generally not arrive with the same sequence timing. Therefore, the synchronization acquisition procedure has to be repeated at the start of each packet. This is accomplished by starting each packet with a preamble which does not contain any data modulation. The duration of the preamble is sufficient for the receiver to go through the worst-case synchronization search, adjust the local sequence to the correct timing, and receive the signal with full processing gain, before the start of any data modulation. If the preamble is too short and the receiver fails to synchronize before the data starts, then data errors will occur. This is a particular problem in communication systems which use time division multiple access to communicate short packets from many transmitters to one receiver.

From the point of view of communication efficiency, the preamble is wasted time. Therefore, it is desirable to use as short a duration for the preamble as possible while retaining reliable synchronization acquisition. The length of time required to acquire synchronization is approximately proportional to the length of the pseudo-random sequence. This is because, in the worst-case scenario, the acquisition process must step through the full length of the sequence before discovering the correct timing. Typically, the duration of each step is proportional to the length of the sequence, but this is not required. Thus, a short pseudo-random sequence can provide a short preamble time.

In addition to the rule regulating bandwidth spread and processing gain, the FCC imposes a spectral power density rule. FCC Rule 15.247 requires that the signal power must be evenly spread over the bandwidth so that no more than +8 dBm of power may be concentrated within any three kilohertz bandwidth. In the prior art, the maximum power density is approximately inversely proportional to the length of the pseudo-random sequence.

Two methods of compliance with the spectral power density rule have been used. First, the communication system may use a long pseudo-random sequence. For example, a sequence length on the order of 255 chips will spread the power sufficiently for a one watt transmitter to meet the +8 dBm rule. However, such a long pseudo-random sequence produces a long acquisition time and a very wasteful preamble.

Second, the communication system may use a low power transmitter. For example, if a 389 milliwatt transmitter is used, the power density rule will be met if the sequence length is about 63 chips. However, a low power transmission is more susceptible to interference. It would be preferable to use a high-power transmitter so that the receiver could be spaced further away.

Thus, according to the prior art, the power density rule creates a trade-off between lower power transmitters, with a higher susceptibility to interference, and longer sequence lengths, with reduced communication efficiency.

In view of the foregoing, it is an object of the present invention to provide a communication system having a short preamble and a high transmitter power, while still meeting the FCC power density rule.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to spread spectrum transmitter having an apparatus to modulate a signal. The apparatus includes a first modulator which modulates the signal with a pseudo-random sequence to spread the signal across a wider bandwidth. The apparatus also includes a second modulator which modulates the signal with a phase reversal pattern to reduce the maximum power density of the signal.

BRIEF DESCRIPTION OF THE DRAWING

The accompanying drawings, which are incorporated in and constitute a part of the specification, schematically illustrate a preferred embodiment of the invention and, together with the general description given above, and the detailed description below, serve to explain the principles of the invention.

DESCRIPTION OF THE PREFERRED EMBODIMENTS

Figure 1:
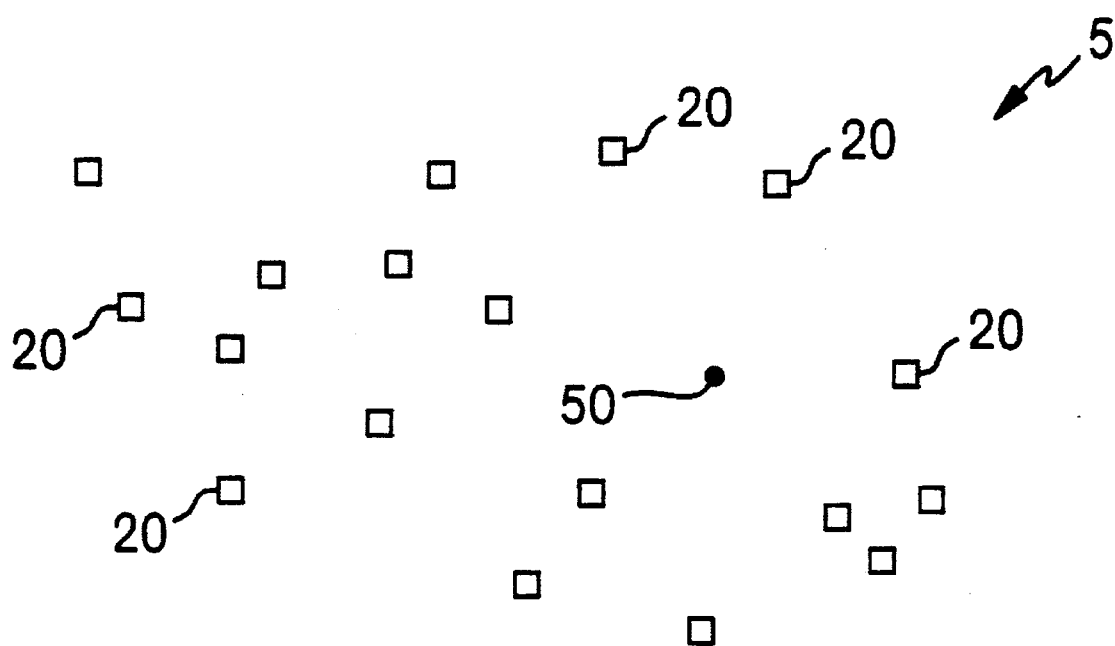
FIG. 1 is a schematic illustration of a radio communication system.

As shown in FIG. 1, a communication system 5 contains may have a plurality of transmitters 20 and a single receiver 50. By increasing the power of transmitters 20, the transmitters 20 can be located further away from receiver 50. Communication system 5 might be a cellular communication system, but the invention may be applied to any sort of communication system.

In the preferred embodiment, information is transmitted from transmitters 20 to receiver 50 in short data packets. Each packet contains a preamble during which no data modulation occurs and a data transmission period during which the carrier is data modulated. The receiver 50 uses the preamble to synchronize with the received signal.

Figure 2:
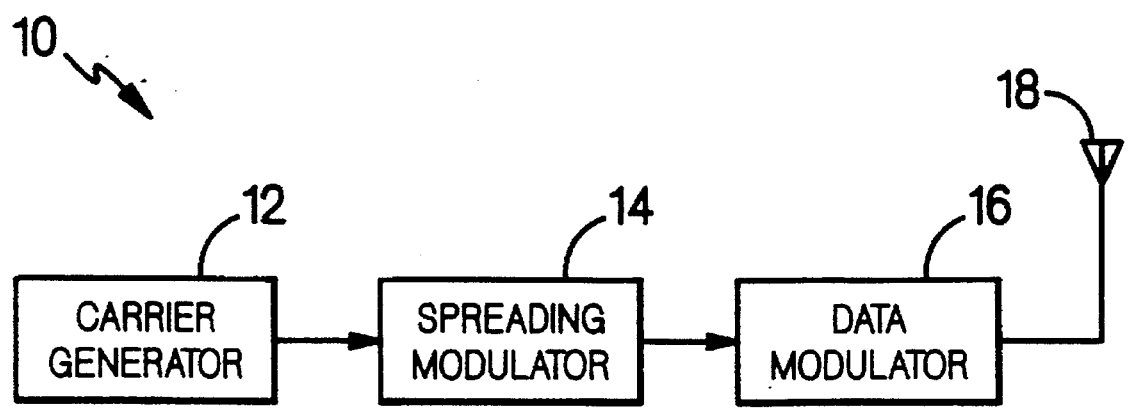
FIG. 2 is a block diagram which schematically illustrates a prior art spread spectrum transmitter.

Certain parts of a prior art spread spectrum transmitter 10 are shown by block diagram in FIG. 2. In transmitter 10, a carrier generator 12 provides a carrier signal at a specific frequency. In the preferred embodiment, the specific frequency is suitable for radio communication. In its simplest form, the carrier signal may be conceived as a single-frequency sine wave. The carrier signal is modulated by the spreading modulator 14. Spreading modulator 14 applies a pseudo-random sequence to modulate the carrier signal, and expands the bandwidth of the one-frequency carrier signal to occupy at least a 500 kHz bandwidth as required by FCC Rule 15.247. The spread signal is then passed through a data modulator 16. Data modulator 16 modulates the signal in response to an information signal from some data source (not shown). In a preferred embodiment, the spreading modulation may be biphase modulation. Data modulator 16 may use the same form of modulation, such as phase, frequency, or amplitude modulation, and share the same hardware, as the spreading modulator 14, but this is not required. Finally, transmitter 10 generates a radio signal which is transmitted from antenna 18.

As previously described, FCC Rule 15.247 restricts the maximum power density in any three kilohertz bandwidth to +8 dBm. The most direct approach to meet the FCC restriction is to use a lower power transmitter. However, a low power transmitter makes communication system 5 more susceptible to interference. An alterative approach is to use a longer spreading function to produce a larger number of spectral lines. However, if a longer spreading function is used, as discussed, then the receiver will take a longer time to synchronize the signals.

Figure 3:
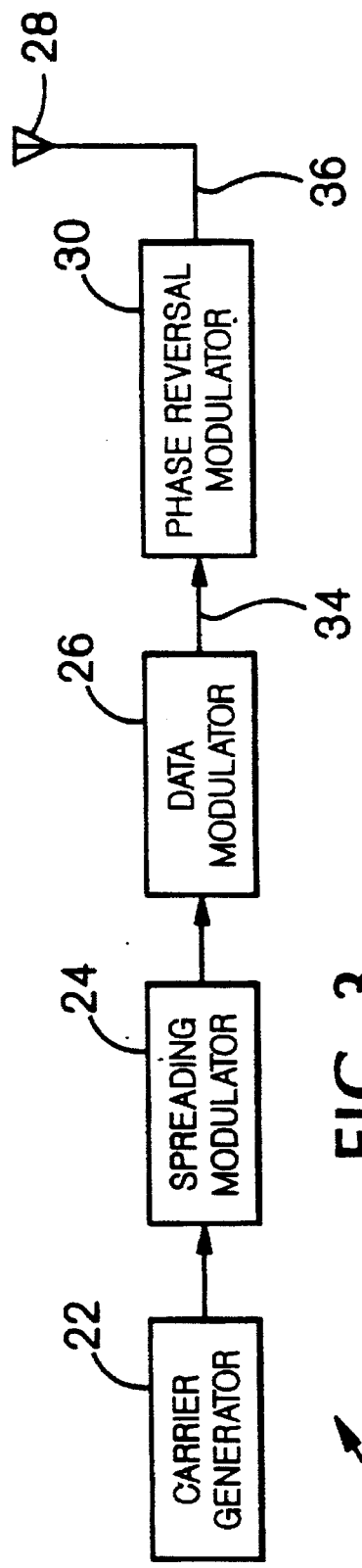
FIG. 3 is a block diagram which schematically illustrates a spread spectrum transmitter according to the present invention.

The improved transmitter 20 constructed in accordance with the present invention is shown in block diagram in FIG. 3. Certain elements of transmitter 20 not relevant to the invention have been omitted. Such elements may be provided according to practices well known to those in the art. Transmitter 20 includes a carrier generator 22, a spreading modulator 24, a data modulator 26, a phase reversal modulator 30, and a radio transmitting antenna 28. In accordance with FCC Rule 15.247, the carrier frequency may be within the band 902 MHz to 928 MHz.

Phase reversal modulator 30 reverses the phase of the signal with a pattern that increases the number of spectrum lines produced by transmitter 20 and thereby decreases the power density of the broadcast signal. However, the phase reversal pattern is transparent to the search process used by receiver 50 for the spreading modulation, so that a short pseudo-random sequence may be used for spreading the bandwidth. This permits a high power transmitter to have a fast acquisition time, and still meet FCC Rule 15.247 for power density.

In one preferred embodiment, the phase reversal pattern continues during the data modulation but is transparent to the amplitude modulated data. The duration of each period of the phase reversal pattern may be equal to an integer multiple of the duration of a bit of data. Preferably, each period of the phase reversal pattern is the same duration as one bit of data.

In an alternate embodiment, the phase reversal pattern may be turned off when the data modulation starts, because the data modulation itself has the effect of increasing the spectral spread. For this purpose, a switch (not shown) may control phase reversal modulator 30 to shut it off when data modulation is occurring by means of data modulator 30. The switch may be triggered by the end of the preamble.

Figure 4:
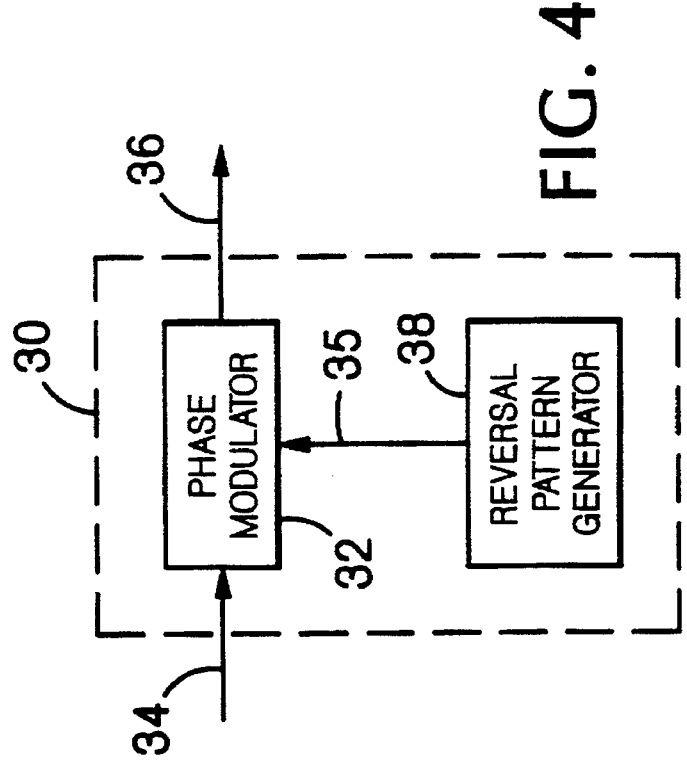
FIG. 4 is a schematic block diagram of a circuit to carry out the phase reversal function of the present invention.

A block diagram of phase reversal modulator 30 is shown schematically in FIG. 4. Phase reversal modulator 30 includes a phase modulator 32, such as a BPSK Modulator produced by Mini-Circuits, which applies a 180° phase shift to the signal 34 from data modulator 26 in response to an input line 35 to create output 36. a reversal pattern generator 38, which may be constructed according to practices well known in the art, may generate a transistor-transistor logic (TTL) compatible signal on input line 35. Output signal 36 is applied to transmitter antenna 28. Phase reversal modulator 30 is shown as a separate component for clarity of discussion, but those skilled in the art will recognize that in some implementations phase reversal modulator 30 may share hardware with spreading modulator 24 and data modulator 26.

Figure 5A:
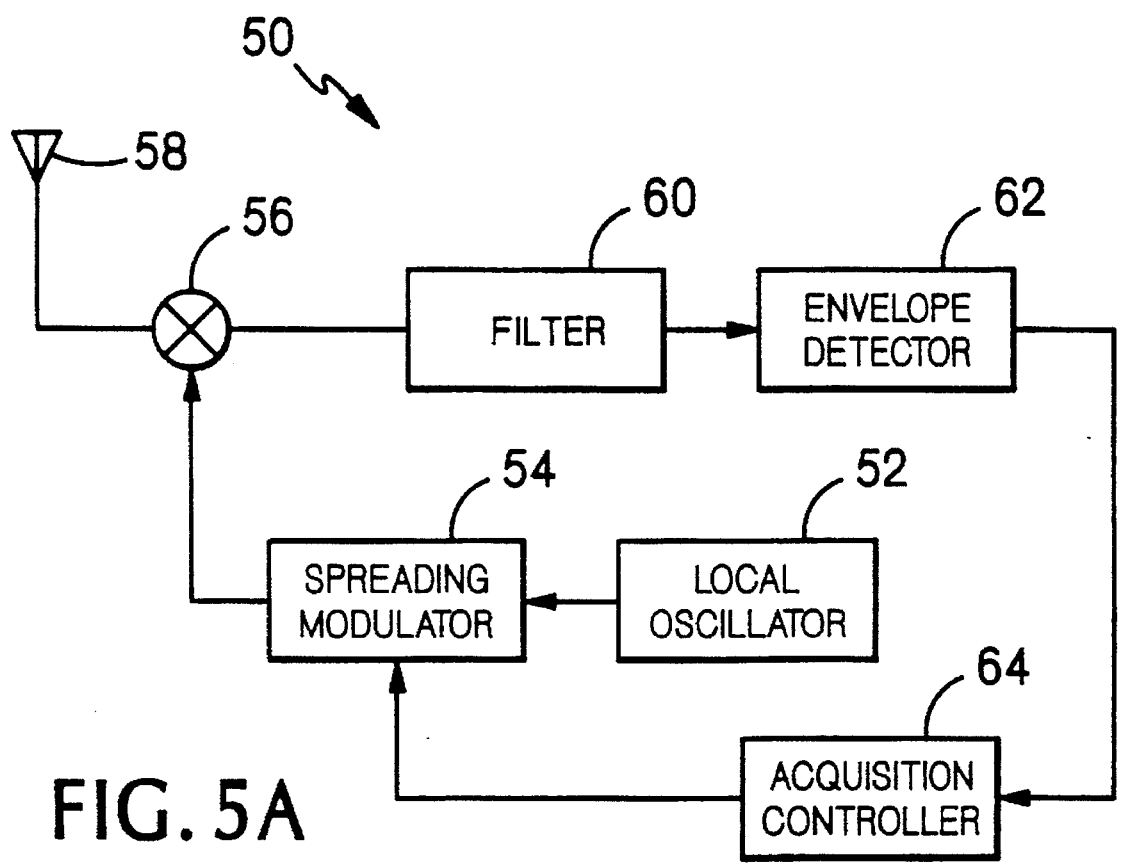
FIG. 5A is a block diagram which schematically illustrates a spread spectrum receiver.

A receiver 50 constructed in accordance with the present invention is shown in block diagram in FIG. 5A. The receiver 50 synchronizes the locally generated pseudo-random sequence with the timing of the sequence modulation on the received signal. The receiver 50 does not require an additional function to remove the phase reversal pattern in order to properly receive and descramble the spread signal generated by improved transmitter 20. As will be explained, the receiver 50 does not need to remove the phase reversal pattern from the received signal to acquire synchronization with the spreading pattern.

In receiver 50, a local oscillator 52 generates a local sine wave signal offset from the transmitter frequency by the intermediate frequency, such as 10.7 MHz for a carrier frequency of 915 MHz. This local signal is modulated by a spreading modulator 54 with the same pseudo-random sequence as spreading modulator 24. Mixer 56 modulates the local signal in response to the received signal picked up by receiving antenna 58. The local signal is then passed through an intermediate frequency filter 60 which has a fairly narrow bandwidth, such as about 100 KHz. The output of filter 60 is detected by envelope detector 62.

As is well known in the art, if the spreading modulator 54 is not synchronized with the pseudo-random sequence on the incoming packet, then the local signal remains spread and only a small portion passes through the intermediate frequency filter 60. On the other hand, if the two pseudo-random sequences are synchronized, then the spreading is cancelled, and the full power of the received signal passes through intermediate filter 60.

An acquisition controller 64 controls spreading modulator 54 to find synchronization. Acquisition controller 64 steps through the local pseudo-random sequence. The voltage output of the envelope detector 62 is fed into the acquisition controller 64, and changes in the voltage are compared. In particular, the acquisition controller 64 searches for a peak in voltage from envelope detector 54 which is greater than voltage at unsynchronized conditions by the processing gain of the receiver.

In the preferred implementation of a spread spectrum receiver, at each test step, acquisition controller 64 measures the voltage from envelope detector 62 for the full length of the spreading sequence. The voltage for the test step is measured and stored, the starting point of the pseudo-random sequence generated by spreading modulator 54 is incremented, and the voltage for the new test step is measured and stored again. If the new voltage is not significantly higher than the stored voltage value, then the search continues in another test step. The incrementing process continues until the voltage increases. Then the acquisition controller switches to a finer search to peak the voltage and perfect the synchronization between the locally generated sequence and the sequence on the incoming packet.

Figure 5B:
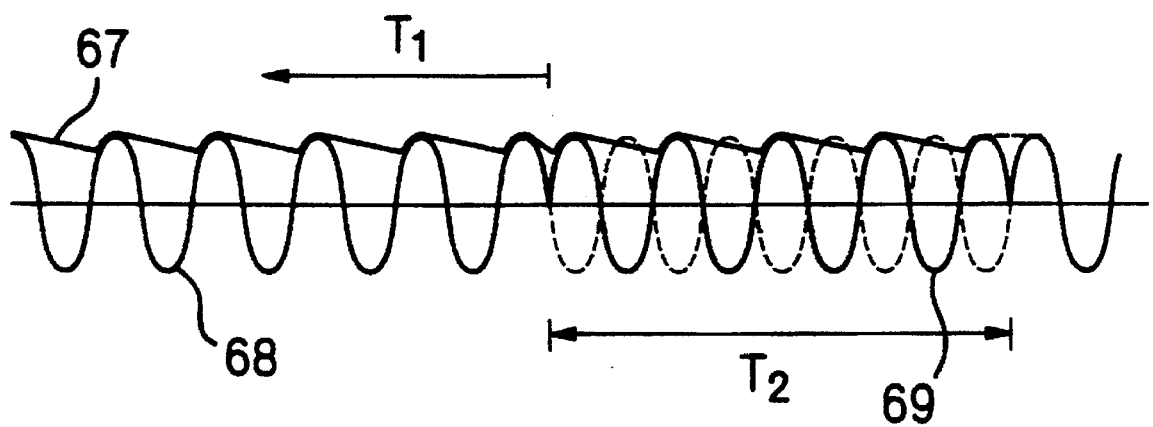
FIG. 5B is an illustration demonstrating the insensitivity of an envelope detector to phase reversal.

The present invention utilizes the fact that the envelope detector 62 and therefore the acquisition controller 64 are not sensitive to the phase of the incoming carrier signal. As shown by FIG. 5B, an envelope detector, such as a standard linear diode detector, produces the same output voltage 67 from original signal 68 during period $T_1$ as during period $T_2$ when the phase of the input signal 69 has been shifted by 180°. Because detectors for both amplitude modulation and frequency modulation incorporate envelope detection, the phase reversal modulation of the signal will be transparent for the purpose of both acquisition control and data reception for these modulators. In general, as realized in the present invention, an additional phase reversal modulating function can be imposed by the transmitter during the preamble of the signal without modifying the receiver. As long as the frequency of the reversals is low compared to the bandwidth of the intermediate frequency filter, the acquisition controller will function correctly. For example, if the intermediate frequency filter bandwidth is about 100 KHz, then the duration of each phase reversal period should be greater ten microseconds, and more preferably greater than twenty microseconds. Typically, the duration of each reversal period is an integer multiple, such as one or two, of the duration of the entire spreading sequence.

Figure 6:
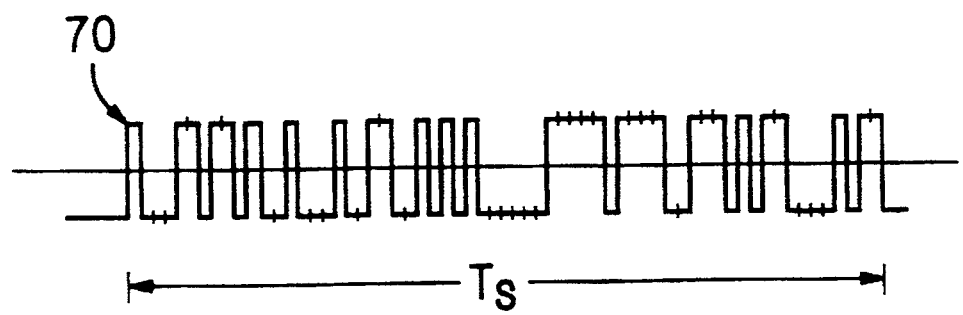
FIG. 6 illustrates a pseudo-random pattern suitable for spreading the bandwidth of a signal.
Figure 7:
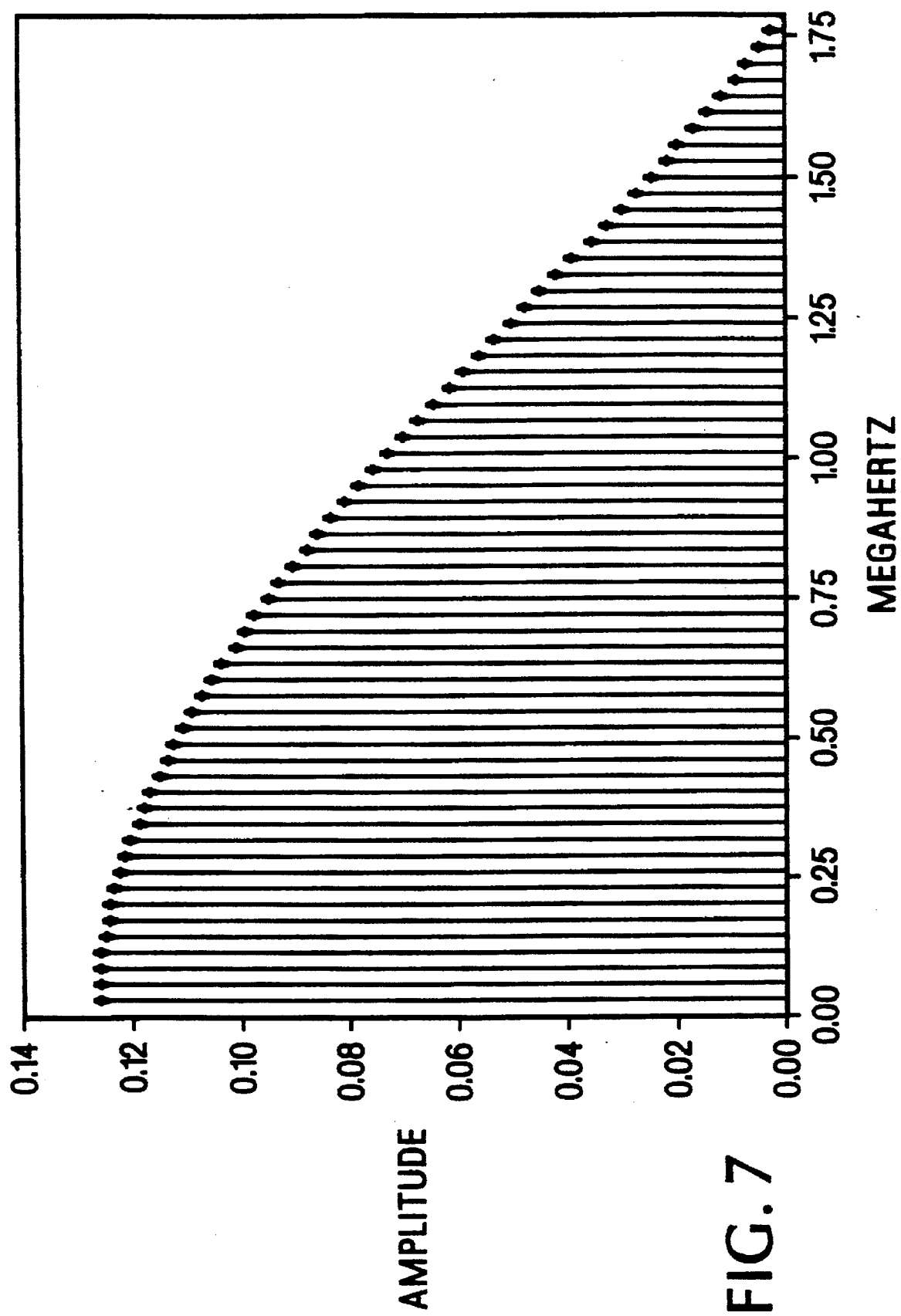
FIG. 7 is a graph of the amplitude of the signal as a function of frequency, from a prior art transmitter using the pseudo-random sequence shown in FIG. 6 at a chip rate of 1.8144 MHz.

The ability of the present invention to reduce the power density of the signal compared to prior art systems will first be discussed with reference to FIGS. 6-9. FIG. 6 illustrates a pseudo-random pattern 70 suitable for spreading the bandwidth of a signal. The pseudo-random pattern is a sixty-three chip sequence, total duration $T_s$, of pseudo-random +1 and −1 values. A graph of the amplitude of the carrier spread by the pseudo-random pattern of FIG. 6, as a function of frequency, is shown in FIG. 7. The spectral lines shown in FIG. 7 are each a fraction of the original unspread amplitude, and are calculated under the assumption that the chip rate is 1.8144 MHz and that the spreading modulator creates biphase modulation. The lines occur at the harmonics of 1.8144 MHz/63 or every 28.8 kHz. The total duration $T_s$ of sequence 70 equals 34.7 microseconds.

As shown in FIG. 7, the largest line in the spectrum has an amplitude of 0.1269 relative to the amplitude of an unspread signal. Therefore, the power of the largest line in the spread spectrum is 20 $\log_{10}[0.1269]=17.9$ dB below the total power of the signal. Assuming that the total power of transmitter 10 is one watt, or 30 dBm, the power of the largest line in the spread spectrum would be 30−17.9=12.1 dBm. Since FCC Rule 15.247 restricts the total power in a three kilohertz band to 8.0 dBm, the largest line would exceed the FCC restriction by 4.1 dBm. Therefore, in order to comply with the FCC rule, a transmitter 10 using the sixty-three chip sequence 70 can only operate at 389 milliwatts or 25.9 dBm.

Figure 8:
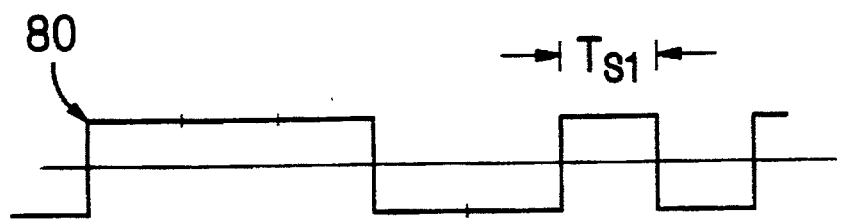
FIG. 8 illustrates a pseudo-random phase reversal pattern according to the present invention.

A sample reversal pattern used by transmitter 20 according to the present invention is illustrated by FIG. 8. The reversal pattern 80 is a pseudo-random pattern seven periods long. Each period $T_{s1}$ is as long as the total duration of the pseudo-random spreading sequence. At a chip rate of 1.8144 MHz, the duration of each period is 34.7 microseconds (63 chips/1.8144×10$^6$ chips/sec). The pseudo-random sequence may be expressed as +1, +1, +1, −1, −1, +1, −1, although, of course, the starting point in the sequence is arbitrary.

Figure 9:
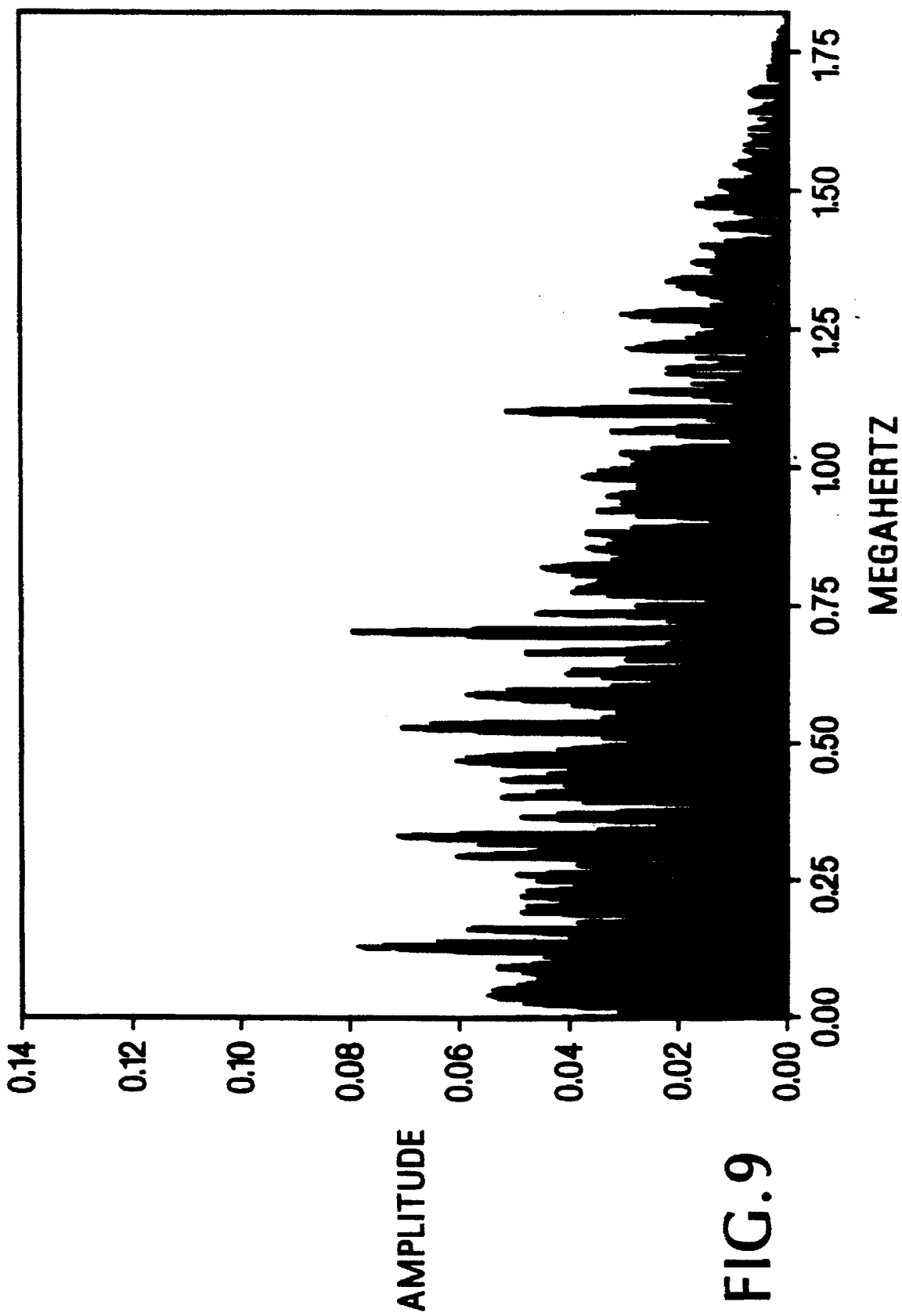
FIG. 9 is a graph of the amplitude of the signal as a function of frequency, from a transmitter according to the present invention using the phase reversal pattern shown in FIG. 8.

The effect on the spectrum from applying the phase reversal pattern 80 in addition to the spreading sequence 70 is shown by the graph of FIG. 9. Applying the additional phase reversal pattern 80 splits each line into seven, so that the spectral line separation is reduced from 28.8 kHz to 4.11 kHz.

As shown in FIG. 9, the largest line in the spectrum has an amplitude of 0.0795 relative to the amplitude of an unspread signal. Therefore, the power of the largest line in the spread and phase-reversed spectrum is 20 $\log_{10}[0.0795]$ =22 dB below the total power of the signal. Therefore, for a 30 dBm transmitter, the power of the largest line will be 30 dBm−22 dBm=8 dBm. By incorporating the phase reversal pattern of the present invention, transmitter 20 could use a sequence shorter than 255 chips and operate at one watt, and still comply with FCC Rule 15.247. In fact, transmitter 20 could use just a sixty-three chip sequence.

Figure 10:
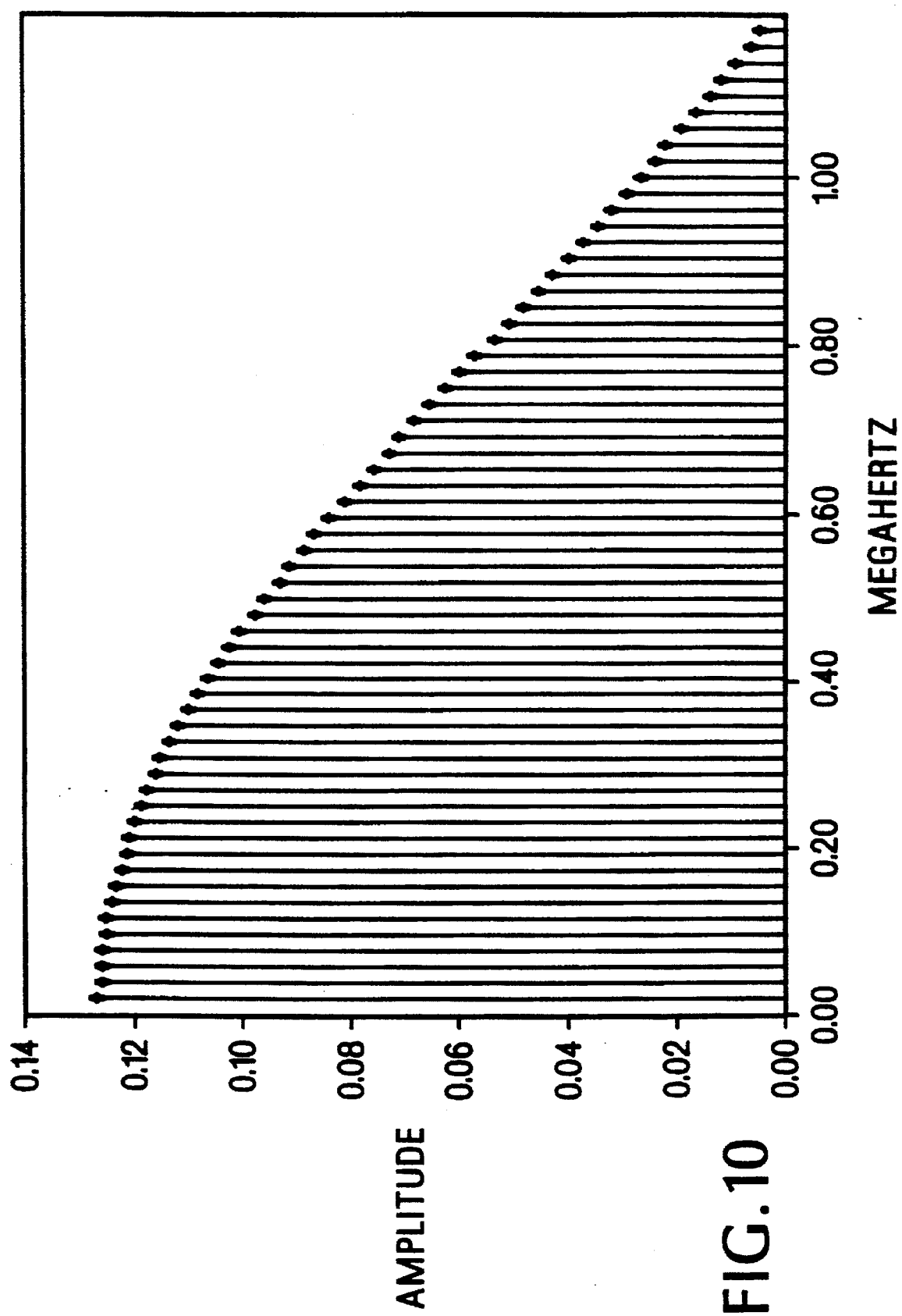
FIG. 10 is a graph of the amplitude of the signal as a function of frequency, from a prior art transmitter using the pseudo-random sequence shown in FIG. 6 at a chip rate of 1.2096 MHz.

While the pseudo-random phase reversal pattern 80 is preferred at high chip rates, it is not appropriate at lower chip rates. This is because the spectral line spacing becomes too close, and two lines may fall within a single three kilohertz measurement bandwidth. FIG. 10 shows the amplitude of the carrier spread by the sequence of FIG. 6, calculated under the assumption that the chip rate is 1.2096 MHz and that the spreading modulator creates biphase modulation. At a chip rate of 1.2096 MHz and a pseudo-random sequence length of sixty-three chips, the spreading modulation produces spectral lines every 19.2 kHz. Applying the additional phase reversal pattern 80 will split each line into seven, so that the spacing between spectral lines is 2.74 kHz. Since the measurement bandwidth is three kilohertz, two lines may be seen at once, and a one watt transmitter will violate the FCC rule.

In another embodiment of the present invention, the pseudo-random phase reversal pattern is changed to a phase reversal pattern that contains only odd-harmonics of the pattern frequency. When an odd-harmonic phase reversal pattern is applied to a spread signal, the resulting spectral lines are separated by twice the pattern frequency. For all patterns that contain only odd harmonics, the amplitude value at any given time is equal to the negative of the amplitude value one-half period earlier or later than that time (E. A. Guillemin, The Mathematics of Circuit Analysis, John Wiley & Sons, New York, 1949, pp. 454–457).

Figure 11:
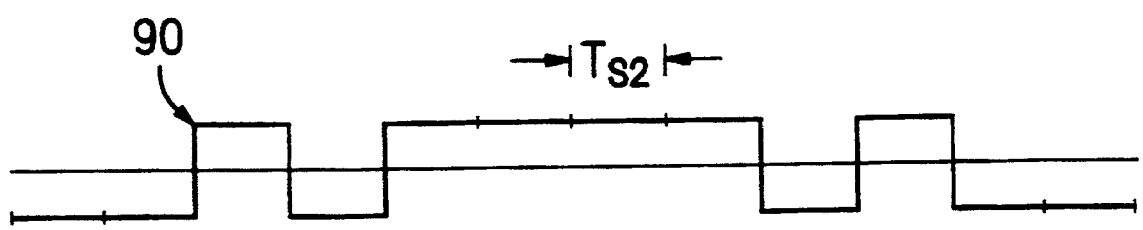
FIG. 11 illustrates an odd-harmonic phase reversal pattern according to the present invention.

A sample odd-harmonic phase reversal pattern 90 according to the present invention is illustrated by FIG. 11. The phase reversal pattern 90 is twelve periods long. Each period $T_{s2}$ is as long as the total duration $T_s$ of the spreading sequence. Assuming a chip rate of 1.2096 MHz and a sixty-three chip sequence, each period is (63 chips/1.2096× 10$^6$ chips/sec) 52.08 microseconds. The sequence may be expressed as −1, −1, +1, −1, +1, +1, +1, +1, −1, +1, −1, −1. Again, the starting point in the pattern is arbitrary. The pattern frequency is (12 periods/52.08 microseconds) 1.6 kHz.

Figure 12:
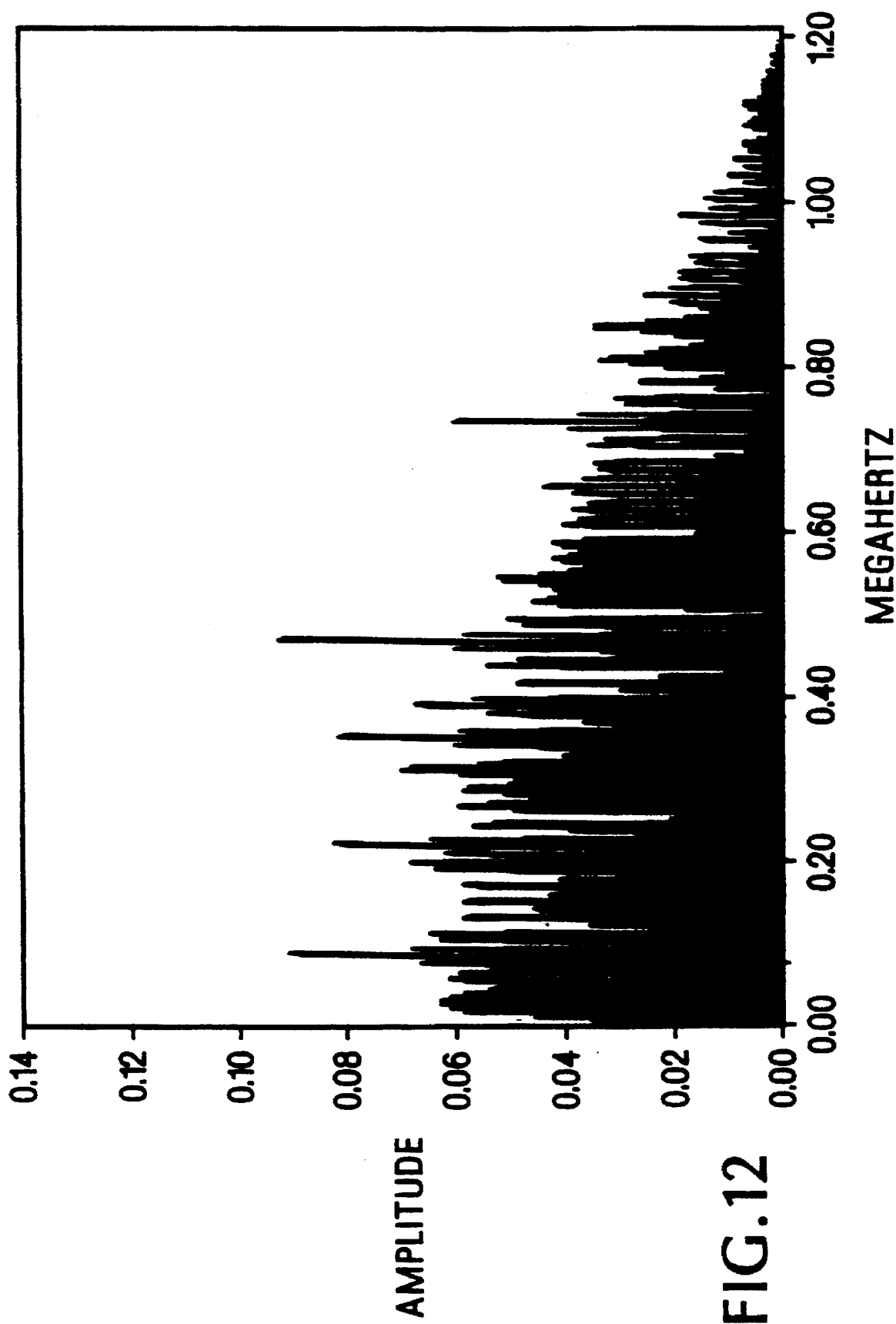
FIG. 12 is a graph of the amplitude of the signal as a function of frequency, from a transmitter according to the present invention using the odd-harmonic phase reversal pattern shown in FIG. 11.

The effect of applying the odd-harmonic phase reversal pattern 90 in addition to the spreading sequence 70 is shown by the graph of FIG. 12. The spectral lines are separated by 3.2 kHz (twice the pattern frequency of 1.6 kHz), which is sufficiently far apart that only one line falls within the three kilohertz band for the FCC rule.

As shown in FIG. 12, the largest line in the spectrum has an amplitude of 0.0910 relative to the amplitude of an unspread signal. Therefore, the power in largest line in the spread and phase-reversed spectrum is 20 $\log_{10}[0.0910]$= 20.8 dB below the total power of the signal. A 758 milliwatt, or 28.8 dBm transmitter, may use the sixty-three chip sequence and still comply with FCC Rule 15.247. Although this is not as large an improvement as the pseudo-random reversal pattern at the higher data rate, there is a 2.9 dB improvement over the system which does not use the phase reversal pattern.

Another embodiment for the low chip rate case is to use a ternary odd-harmonic sequence for the phase reversal pattern. The ternary pattern uses values of +1, −1, and 0. The zero value indicates that the transmitter is turned off for that period of the pattern.

Figure 13:
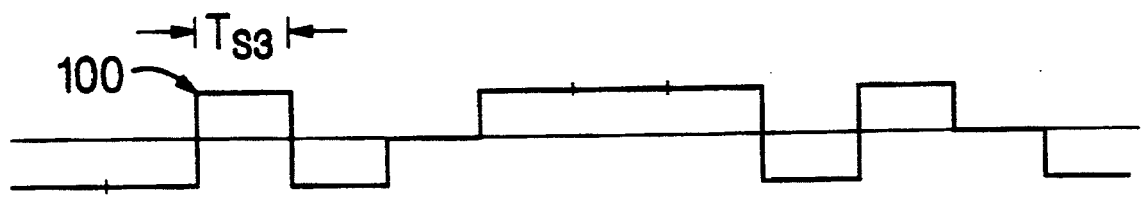
FIG. 13 illustrates a ternary odd-harmonic phase reversal pattern according to the present invention.

A sample ternary odd-harmonic phase reversal pattern 100 according to the present invention is illustrated by FIG. 13. The ternary reversal pattern 100 is twelve periods long. Again, each period $T_{s3}$ is as long as the total duration $T_s$ of the spreading sequence. The sequence may be expressed as −1, −1, +1, −1, 0, +1, +1, +1, −1, +1, 0, −1. Of course, the starting point is arbitrary.

Figure 14:
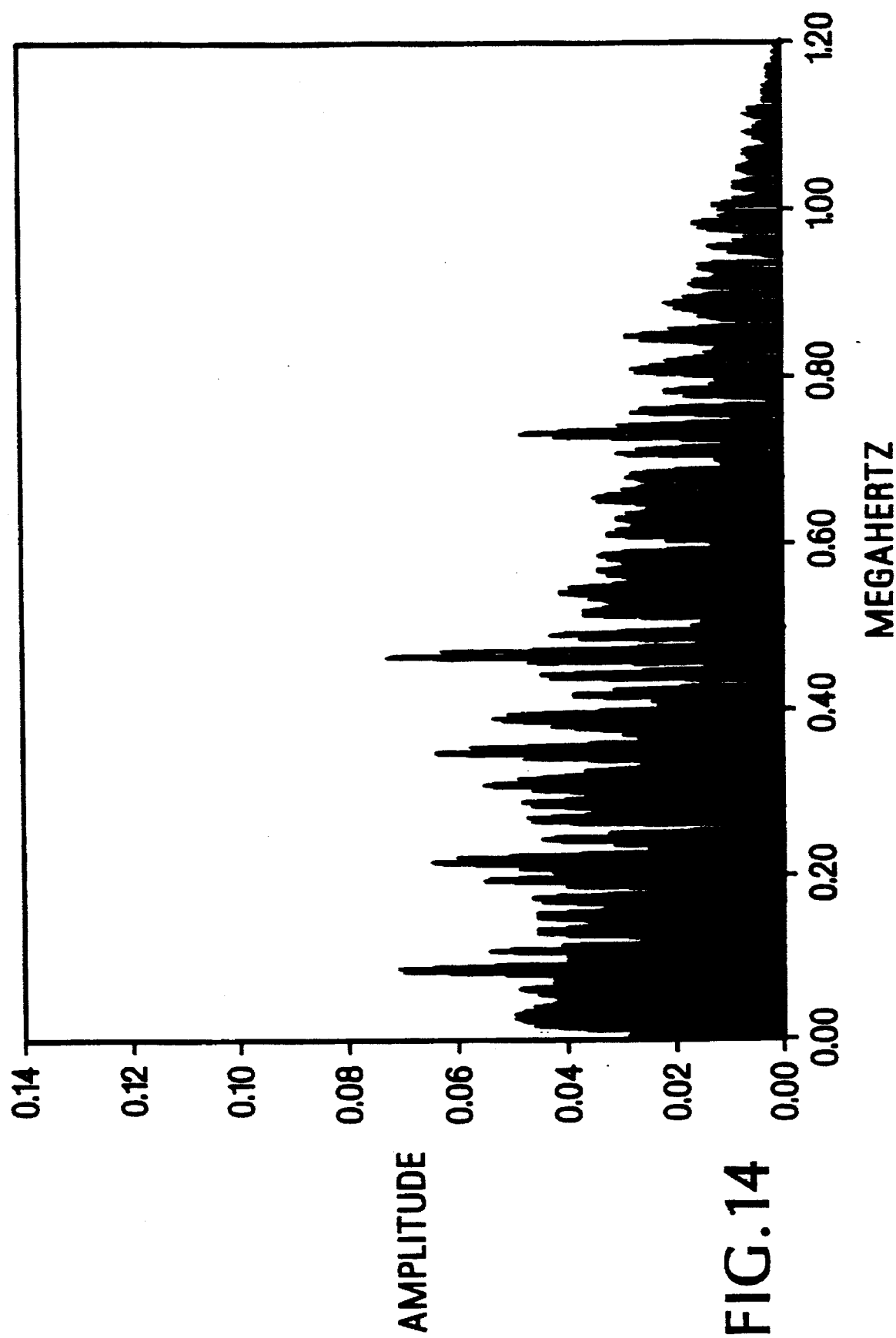
FIG. 14 is a graph of the amplitude of the signal as a function of frequency, from a transmitter according to the present invention using the ternary odd-harmonic phase reversal pattern shown in FIG. 13.

The effect of applying the phase reversal pattern 100 in addition to the spreading sequence 70 to a 1.210 MHz chip rate is shown by the graph of FIG. 14. The spectral lines are separated by 3.2 kHz.

FIG. 14 shows that the largest line in the spectrum has an amplitude of 0.0719 relative to the amplitude of an unspread signal. Therefore, the power in largest line in the spread and phase-reversed spectrum is 22.86 dB below the total power of the signal. Therefore, a transmitter 20 using ternary phase reversal pattern 100 may operate at one watt or 30 dBm, use the sixty-three chip sequence, and still comply with FCC Rule 15.247 with a 0.86 dBm margin. Alternately, transmitter 20 could use a spreading sequence shorter than sixty-three chips, and comply with the FCC Rule with a reduced margin. However, the off period in the ternary phase reversal pattern may not be compatible with other system considerations, and thus is not applicable to all system designs.

The invention has been described in terms of biphase modulation by a spreading modulator, but the invention is not so limited. According to the present invention, the modulation applied to the carrier by the spreading modulator, phase reversal modulator, and data modulator, could be amplitude modulation, frequency modulation, phase modulation, or a combination thereof. Also, the phase reversal modulation need not actually be separated from the spreading modulation in certain implementations.

It is to be understood that spreading modulator 24, data modulator 26, and phase reversal modulator 28 may be physically separated, or they may be combined and share electronic components. Also, carrier generator 22 and the modulation functions may be integrated in a single device. For example, by frequency modulating a carrier generator, both of those functions are carried out simultaneously. The modulation functions could be carried out by software or hardware, and in a digital or analog format.

Furthermore, the order of the elements may be changed. For example, the data modulation could be applied to the signal before the signal spreading, or the phase reversal pattern could be applied to the signal before the data modulation. In addition, the modulation functions could be applied indirectly by modulating signals from other functions rather than directly modulating the signal from carrier generator 22. For example, phase reversal modulator 28 might modulate a data signal or a spreading signal. Any such reordering or combination of elements is within the scope of the invention.

The present invention has been described in terms of a preferred embodiment. The invention, however, is not limited to the embodiment depicted and described. Rather the scope of the invention is defined by the appended claims.

What is claimed is:

1. A spread spectrum transmitter apparatus, comprising:
    a signal source to generate a signal having a first bandwidth;
    a first modulation function which modulates said signal with a pseudo-random pattern to spread said signal across a second bandwidth broader than said first bandwidth, said pseudo-random pattern having a first periodicity equal to a first duration;
    a second modulation function which modulates a preamble of said signal with a phase reversal pattern, other than said pseudo-random pattern or a data pattern, said phase reversal pattern being transparent to an acquisition controller of a spread spectrum receiver, said phase reversal pattern selected to reduce the maximum power density of said signal by spreading the power density more uniformly through said second bandwidth by reducing spectral line separation, said phase reversal pattern including a series of phase reversal periods, each of said periods having a second duration; and
    an antenna to transmit said signal as modulated by said first and second modulation functions.

2. The apparatus of claim 1 wherein said second duration is equal to an integer multiple of said first duration.

3. The apparatus of claim 2 wherein said second duration is equal to said first duration.

4. The apparatus of claim 1 wherein said pseudo-random pattern is a modulation sequence having an integer number of chips.

5. The apparatus of claim 4 wherein said integer number is less than 255.

6. The apparatus of claim 5 wherein said integer number is at most 63.

7. The apparatus of claim 1 wherein said second duration is equal to an integer multiple of a bit time.

8. The apparatus of claim 1 wherein said phase reversal pattern is a pseudo-random sequence.

9. The apparatus of claim 8 wherein said pseudo-random sequence is +1, +1, +1, −1, −1, +1, −1.

10. The apparatus of claim 1 wherein said phase reversal pattern is a sequence containing only odd-harmonics.

11. The apparatus of claim 10 wherein said odd-harmonic sequence is −1, −1, +1, −1, +1, +1, +1, +1, −1, +1, −1, −1.

12. The apparatus of claim 1 wherein said phase reversal pattern is a ternary odd-harmonic sequence.

13. The apparatus of claim 12 wherein said ternary odd-harmonic sequence is −1, −1, +1, −1, 0, +1, +1, +1, −1, +1, 0, −1.

14. The apparatus of claim 1 wherein said apparatus further comprises a data source to generate a data information pattern, and a third modulation function to modulate said signal with said data information pattern.

15. The apparatus of claim 14 wherein said second modulator does not modulate said signal during the transmission of data information pattern.

16. The apparatus of claim 14 wherein said second modulator modulates said signal during the transmission of data information pattern.

17. The apparatus of claim 14 wherein said phase reversal pattern is a pseudo-random sequence.

18. The apparatus of claim 17 wherein said pseudorandom sequence is +1, +1, +1, −1, −1, +1, −1.

19. The apparatus of claim 14 wherein said phase reversal pattern is a sequence containing only odd-harmonics.

20. The apparatus of claim 19 wherein said odd-harmonic sequence is −1, −1, +1, −1, +1, +1, +1, +1, −1, +1, −1, −1.

21. The apparatus of claim 14 wherein said phase reversal pattern is a ternary odd-harmonic sequence.

22. The apparatus of claim 21 wherein said ternary odd-harmonic sequence is −1, −1, +1, −1, 0, +1, +1, +1, −1, +1, 0, −1.

23. A spread spectrum transmitter apparatus, comprising:
    means to generate a transmitted signal having a first bandwidth at a power of one watt;
    a first modulation function which modulates said signal with a pseudo-random pattern to spread said signal across a second bandwidth broader than said first bandwidth, said pseudo-random pattern having a periodicity equal to a first duration and a modulation sequence with an integer number of chips less than 255;
    a second modulation function which modulates a preamble of said signal with a phase reversal pattern to reduce the maximum power density of said signal, said phase reversal pattern including a series of phase reversal periods, each of said periods having a second duration;
    an antenna to transmit said signal as modulated by said first and second modulation functions; and
    wherein no more than +8 dBm of power is concentrated in any three kilohertz bandwidth of said signal.

24. A spread spectrum transmitter apparatus, comprising:
    means to generate a transmitted signal having a first bandwidth at a power greater than 389 milliwatts;
    a first modulation function which modulates said signal with a pseudo-random pattern to spread said signal across a second bandwidth broader than said first bandwidth, said pseudo-random pattern having a periodicity equal to a first duration and a modulation sequence with an integer number of chips equal to or less than 63;
    a second modulation function which modulates a preamble of said signal with a phase reversal pattern to reduce the maximum power density of said signal, said phase reversal pattern including a series of phase reversal periods, each of said periods having a second duration;
    an antenna to transmit said signal as modulated by said first and second modulation functions; and
    wherein no more than +8 dBm of power is concentrated in any three kilohertz bandwidth of said signal.

25. A spread spectrum communication system, comprising:
    (a) a transmitter to generate a transmitted signal, said transmitter including
        i) a signal source to generate a signal having a first bandwidth,
        ii) a data source to generate a data pattern,
        iii) a first modulator which modulates said signal with a pseudo-random pattern to spread said signal across a second bandwidth broader than said first bandwidth, said pseudo-random pattern having a first periodicity equal to a first duration, iv) a second modulator which modulates a preamble of said signal with a phase reversal pattern, other than said pseudo-random pattern or said data pattern, said phase reversal pattern selected to reduce the maximum power density of said signal by spreading the power density more uniformly through said second bandwidth by reducing spectral line separation, said phase reversal pattern including a series of phase reversal periods, each of said periods having a second duration, v) a third modulator for modulating said signal with said data pattern, and vi) an antenna to transmit said signal as modulated by said first, second and third modulation functions; and b) a receiver including i) an antenna to receive said transmitted signal and provide a received signal, ii) a local signal source to generate a local signal, iii) a fourth modulator for modulating said local signal with said pseudo-random pattern, iv) a fifth modulator for modulating said local signal in response to said received signal, and v) means for synchronizing said fourth modulator with said first modulator, said phase reversal pattern being transparent to said synchronization means.

26. The system of claim 25 wherein said phase reversal pattern is a pseudo-random sequence.

27. The system of claim 26 wherein said pseudo-random sequence is +1, +1, +1, −1, −1, +1, −1.

28. The system of claim 25 wherein said phase reversal pattern is a sequence containing only odd-harmonics.

29. The system of claim 28 wherein said odd-harmonic sequence is −1, −1, +1, −1, +1, +1, +1, +1, −1, +1, −1, −1.

30. The system of claim 25 wherein said phase reversal pattern is a ternary odd-harmonic sequence.

31. The system of claim 30 wherein said ternary odd-harmonic sequence is −1, −1, +1, −1, 0, +1, +1, +1, −1, +1, 0, −1.

32. The system of claim 25 wherein said receiver further includes a filter for filtering said local signal.

33. The system of claim 32 wherein said receiver has a bandwidth, and said second duration is greater than the inverse of said bandwidth.

34. A method of operating a spread spectrum transmitter, comprising:

generating a signal having a first bandwidth;

modulating said signal with a pseudo-random pattern to spread said signal across a second bandwidth broader than said first bandwidth, said pseudo-random pattern having a first periodicity equal to a first duration;

modulating a preamble of said signal with a phase reversal pattern, other than said pseudo-random pattern or a data pattern, said phase reversal pattern being transparent to an acquisition controller of a spread spectrum receiver, said phase reversal pattern selected to reduce the maximum power density of said signal by spreading the power density more uniformly through said second bandwidth by reducing spectral line separation, said phase reversal pattern including a series of phase reversal periods, each of said periods having a second duration; and transmitting said signal as modulated with said pseudo random pattern and said phase reversal pattern.

35. A method of operating a spread spectrum system, comprising:

generating a signal having a first bandwidth at a transmitter;

modulating said signal at said transmitter with a pseudo-random pattern to spread said signal across a second bandwidth broader than said first bandwidth;

modulating a preamble of said signal at said transmitter with a phase reversal pattern, other than said pseudo-random pattern or a data pattern, said phase reversal pattern selected to reduce the maximum power density of said signal without increasing the bandwidth said signal beyond said second bandwidth by reducing spectral line separation;

transmitting said signal as modulated with said pseudo random pattern and said phase reversal pattern;

receiving said transmitted signal at a receiver; and synchronizing said received signal at said receiver, said phase reversal pattern being transparent in said synchronization step.

36. A spread spectrum transmitter apparatus, comprising:

a signal source to generate a signal having a first bandwidth;

a first modulation function which modulates said signal with a pseudo-random pattern to spread said signal across a second bandwidth broader than said first bandwidth, said pseudo-random pattern having a first periodicity equal to a first duration;

a second modulation function which modulates a preamble of said signal with a phase reversal pattern, other than said pseudo-random pattern or a data pattern, said phase reversal pattern selected to reduce the maximum power density of said signal by spreading the power density more uniformly through said second bandwidth by reducing spectral line separation, said phase reversal pattern including a series of phase reversal periods, each of said periods having a second duration; and an antenna to transmit said signal as modulated by said first and second modulation functions.

37. A spread spectrum transmitter apparatus, comprising:

a signal source to generate a signal having a first bandwidth;

a first modulation function which modulates said signal with a pseudo-random pattern to spread said signal across a second bandwidth broader than said first bandwidth, said pseudo-random pattern having a first periodicity equal to a first duration;

a second modulation function which modulates a preamble of said signal with a phase reversal pattern, other than said pseudo-random pattern or a data pattern, said phase reversal pattern being transparent to an acquisition controller of a spread spectrum receiver, said phase reversal pattern selected to reduce the maximum power density of said signal, said phase reversal pattern including a series of phase reversal periods, each of said periods having a second duration; and an antenna to transmit said signal as modulated by said first and second modulation functions.

* * * * *